US012759012B2

(12) United States Patent

Kuchinski et al.

(10) Patent No.: US 12,759,012 B2

(45) Date of Patent: Oct. 13, 2026

(54) PLUNGERS FOR SEALANT DISPENSING CARTRIDGES WITH COLLAPSIBLE SEALANT PACKAGING

(71) Applicant: PRC-Desoto International, Inc., Sylmar, CA (US)

(72) Inventors: Paul Kuchinski, Valley Village, CA (US); Oscar Santillan, Camarillo, CA (US)

(73) Assignee: PRC-DESOTO INTERNATIONAL, INC., Sylmar, CA (US)

( * ) Notice: Subject to any disclaimer, the term of this patent is extended or adjusted under 35 U.S.C. 154(b) by 516 days.

(21) Appl. No.: 18/248,576

(22) PCT Filed: Oct. 7, 2021

(86) PCT No.: PCT/US2021/054050

§ 371 (c)(1),
(2) Date: Apr. 11, 2023

(87) PCT Pub. No.: WO2022/081417

PCT Pub. Date: Apr. 21, 2022

(65) Prior Publication Data

US 2024/0017286 A1 Jan. 18, 2024

Related U.S. Application Data

(60) Provisional application No. 63/090,991, filed on Oct. 13, 2020.

(51) Int. Cl.

| | |
|---|---|
| ***B05C 17/005*** | (2006.01) |
| ***B05C 17/015*** | (2006.01) |
| ***B65D 35/12*** | (2006.01) |
| ***B65D 83/00*** | (2006.01) |

(52) U.S. Cl.

CPC .. *B05C 17/00576* (2013.01); *B05C 17/00583* (2013.01); *B05C 17/015* (2013.01); *B65D 83/7713* (2025.01)

(58) Field of Classification Search

CPC ........ B05C 17/00576; B05C 17/00583; B05C 17/015; B65D 83/7713

See application file for complete search history.

(56) References Cited

U.S. PATENT DOCUMENTS

| | | | |
|---|---|---|---|
| 4,323,177 | A | 4/1982 | Nielsen |
| 4,371,094 | A | 2/1983 | Hutter |
| 4,673,396 | A | 6/1987 | Urbaniak |

(Continued)

FOREIGN PATENT DOCUMENTS

| | | | |
|---|---|---|---|
| CN | 103533976 | A | 1/2014 |
| CN | 104097840 | A | 10/2014 |

(Continued)

OTHER PUBLICATIONS

International Search Report and Written Opinion received for PCT Application Serial No. PCT/US2021/054050 dated Jan. 31, 2022, 12 pages.

*Primary Examiner* — Frederick C Nicolas

(57) ABSTRACT

Plungers (50) for use in sealant dispensing cartridges with collapsible sealant packaging (40) are disclosed. The plungers include anti-bypass retainers (60) to reduce or prevent unwanted passage of the flexible sealant packaging around the edges of the plungers during sealant dispensing operations.

22 Claims, 10 Drawing Sheets

(56) References Cited

U.S. PATENT DOCUMENTS

| | | | |
|---|---|---|---|
| 4,694,977 | A | 9/1987 | Graf et al. |
| 4,741,462 | A | 5/1988 | Schneider, Jr. |
| 4,840,293 | A | 6/1989 | Segatz |
| 4,854,485 | A | 8/1989 | Collins |
| 4,869,403 | A | 9/1989 | Bruening |
| 4,907,727 | A | 3/1990 | Ernst et al. |
| 5,211,312 | A | 5/1993 | Chang |
| 5,301,835 | A | 4/1994 | Fulks et al. |
| 5,595,327 | A | 1/1997 | Dentler et al. |
| 6,155,463 | A | 12/2000 | Dentler et al. |
| 7,073,691 | B2 | 7/2006 | Rumrill et al. |
| 7,690,530 | B2 | 4/2010 | Schneider et al. |
| 8,087,550 | B2 | 1/2012 | Schneider et al. |
| 8,342,371 | B2 | 1/2013 | Helmenstein |
| 8,424,727 | B2 | 4/2013 | Herman et al. |
| 9,987,656 | B2 | 6/2018 | Nelson et al. |
| 10,663,893 | B2 | 5/2020 | Hormann et al. |
| 11,541,416 | B2 * | 1/2023 | Lavelanet ......... B05C 17/00583 |
| 11,712,711 | B2 * | 8/2023 | Kuchinski ............ B65D 83/765 222/327 |
| 11,938,506 | B2 * | 3/2024 | Lavelanet ......... B05C 17/00579 |
| 2009/0065527 | A1 | 3/2009 | Buck |
| 2009/0272767 | A1 | 11/2009 | Herman et al. |
| 2010/0276458 | A1 | 11/2010 | Buck |
| 2017/0035654 | A1 | 2/2017 | Py |
| 2019/0176183 | A1 | 6/2019 | Horiguchi et al. |
| 2020/0114085 | A1 | 4/2020 | Ivosevic et al. |
| 2021/0346909 | A1 | 11/2021 | Kuchinski |
| 2022/0184654 | A1 | 6/2022 | Lavelanet et al. |

FOREIGN PATENT DOCUMENTS

| | | | |
|---|---|---|---|
| DE | 3904606 | A1 | 8/1990 |
| EP | 3714994 | A1 | 9/2020 |
| JP | 53-097831 | U | 8/1978 |
| JP | 03-080959 | A | 4/1991 |
| JP | 04-243573 | A | 8/1992 |
| JP | 07-106331 | A | 4/1995 |
| JP | 2003334483 | A | 11/2003 |
| JP | 2014-202012 | A | 10/2014 |
| WO | 2020/058884 | A1 | 3/2020 |

* cited by examiner

PLUNGERS FOR SEALANT DISPENSING CARTRIDGES WITH COLLAPSIBLE SEALANT PACKAGING

CROSS-REFERENCE TO RELATED APPLICATION

This application claims the benefit of U.S. Provisional Patent Application Ser. No. 63/090,991, filed Oct. 13, 2020, which is incorporated herein by reference.

FIELD OF THE INVENTION

The present invention is related to plungers for use in sealant dispensing systems with collapsible sealant packaging.

BACKGROUND INFORMATION

Adhesives and sealants have conventionally been dispensed from disposable cartridges using pneumatic dispensing guns. Collapsible sealant packaging has been proposed, which can take up less space when transported and after sealant has been dispensed from the collapsible packaging. Variable dimensions of plungers and cartridge sleeves may change dispensing performance, including unwanted bypass of a portion of the collapsible packaging around the plunger.

SUMMARY OF THE INVENTION

Disclosed herein is a plunger assembly for use in a sealant dispensing cartridge comprising: a plunger comprising a substantially cylindrical body and front end; and an anti-bypass retainer contacting the plunger comprising a front portion and an anti-bypass rim structured and arranged to expand radially outward when force is applied to the front portion.

Also disclosed herein is a sleeve and plunger assembly for use in a sealant dispensing cartridge comprising: a sleeve; a plunger comprising a substantially cylindrical body and front end; and an anti-bypass retainer contacting the plunger comprising a front portion and an anti-bypass rim structured and arranged to expand radially outward when force is applied to the front portion.

Further disclosed herein is a sealant dispensing system comprising: collapsible sealant packaging comprising a rigid front end including a front opening and a flexible sidewall extending rearwardly from the rigid front end; an inner sleeve structured and arranged to receive the flexible sidewall; and a plunger with an anti-bypass retainer inserted in the inner sleeve structured and arranged to slide forwardly along a longitudinal axis of the inner sleeve and press against a rear end of the flexible sidewall when air pressure is applied against a rear surface of the plunger.

DETAILED DESCRIPTION

Figure 1:
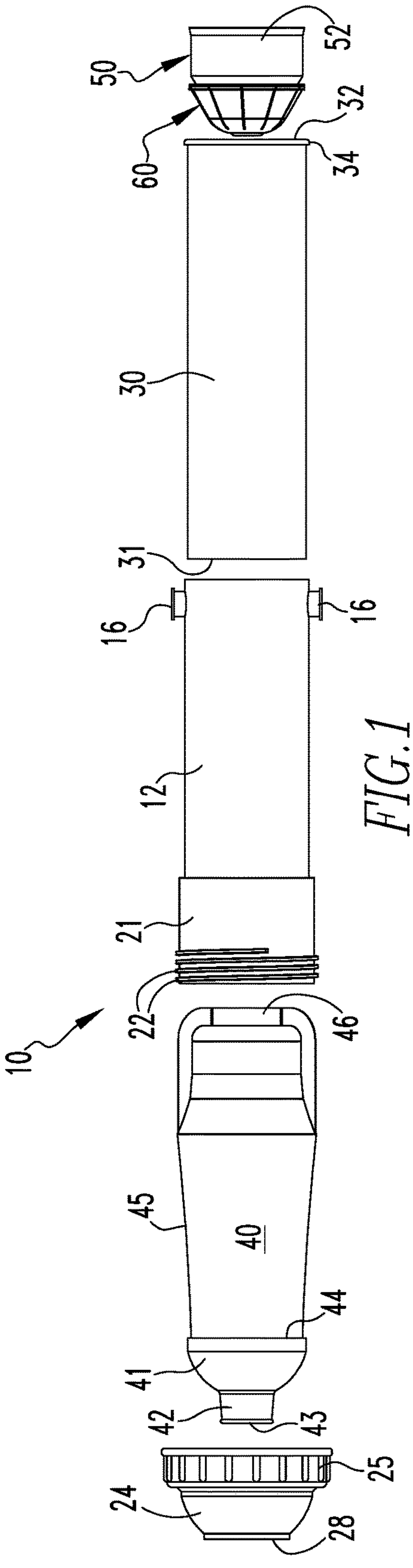
FIG. 1 is an exploded side view illustrating components of a front-loading sealant dispensing system including a plunger with an anti-bypass retainer of the present invention.

FIG. 1 illustrates a front-loading adhesive and sealant dispensing system 10 that may incorporate plungers having anti-bypass retainers of the present invention. The dispensing system 10 includes a generally cylindrical outer retaining sleeve 12 having a front end 13 and a rear end 14. Rear retaining pins 16 are provided near the rear end 14 of the outer retaining sleeve 12. The dispensing system 10 includes a front cap assembly 20 having a collar 21 with external threads 22. The collar 21 may be attached to the outer retaining sleeve 12 by adhesive and/or press fit. The front cap assembly 20 includes a removable front cap 24 having a rim 25 with internal threads 26 that threadingly engage the external threads 22 of the collar 21. The removable front cap 24 has a hemi-spherical domed shape 27 and a front opening 28. Although a particular dispensing system 10 is shown in FIG. 1, it is to be understood that the plungers with anti-bypass retainers of the present invention may be used with any other suitable dispensing system for collapsible sealants.

A generally cylindrical inner sleeve 30 fits inside the outer retaining sleeve 12. The sleeve 30 includes a front end 31 and a back end 32 having a retaining flange 34. Collapsible sealant packaging, e.g., in the form of an adhesive or sealant-containing cartridge 40 having a flexible sidewall 45 is located within the sleeve 30 and front cap assembly 20. The collapsible sealant packaging 40 includes a domed rigid front end 41 with a front tip 42 and front opening 43. The rigid front end 41 has a rear rim 44. The collapsible sidewall 45 of the cartridge 40 has a rear end 46. An uncured adhesive or sealant may be filled into and subsequently dispensed from the cartridge 40.

A plunger assembly 48 including a plunger 50 with an anti-bypass retainer 60 is located inside the sleeve 30. The tolerance or fit between the sleeve 30 and the plunger 50 and retainer 60, and the materials used to make the sleeve 30, plunger 50 and retainer 60, may be selected in order to allow the plunger 50 to move in relation to the sleeve 30 under air pressure applied by a conventional pneumatic gun, while providing a sufficiently tight seal that prevents air from passing between the interface between the sleeve 30 and the plunger 50. As more fully described below, the plunger 50 includes a front anti-bypass retainer 60 that presses against the rear end 46 of the flexible sidewall 45 of the sealant packaging 40. The retainer 60 may radially expand in a manner that prevents the collapsible packaging 40 from by-passing around the retainer 60 and plunger 50. Expansion of the retainer 60 may prevent the flexible sidewall 45 of the collapsible packaging 40 from by-passing around the plunger 50, which could otherwise cause slow bleed of the sealant out of the front nozzle during the dispensing process.

Figure 2:
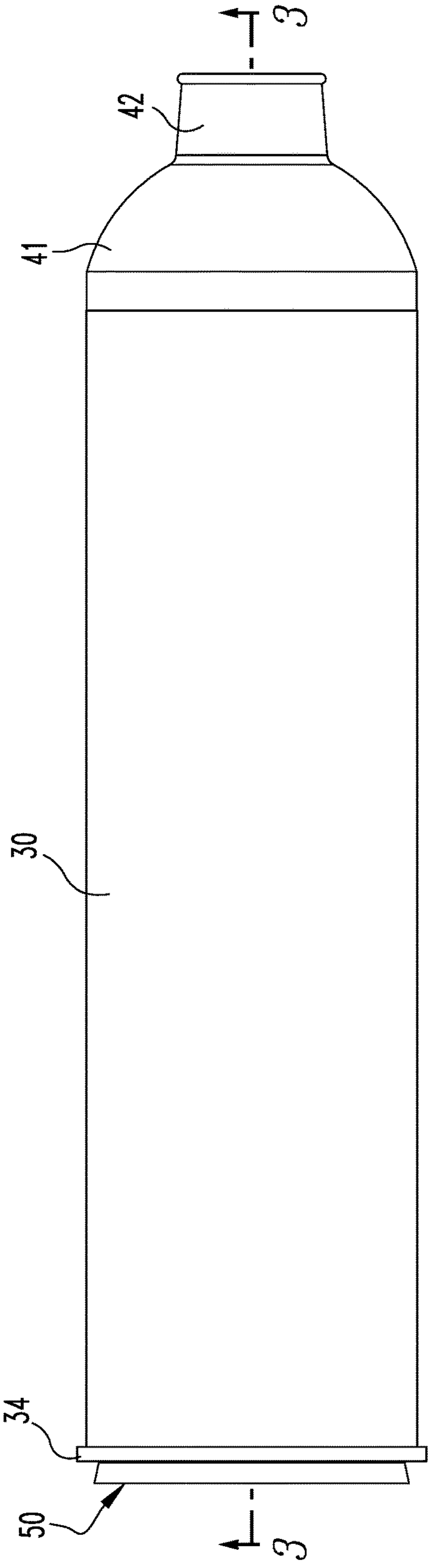
FIG. 2 is a side view of a sealant dispensing sleeve and front cap assembly in which a plunger with an anti-bypass retainer of the present invention is inserted.
Figure 3:
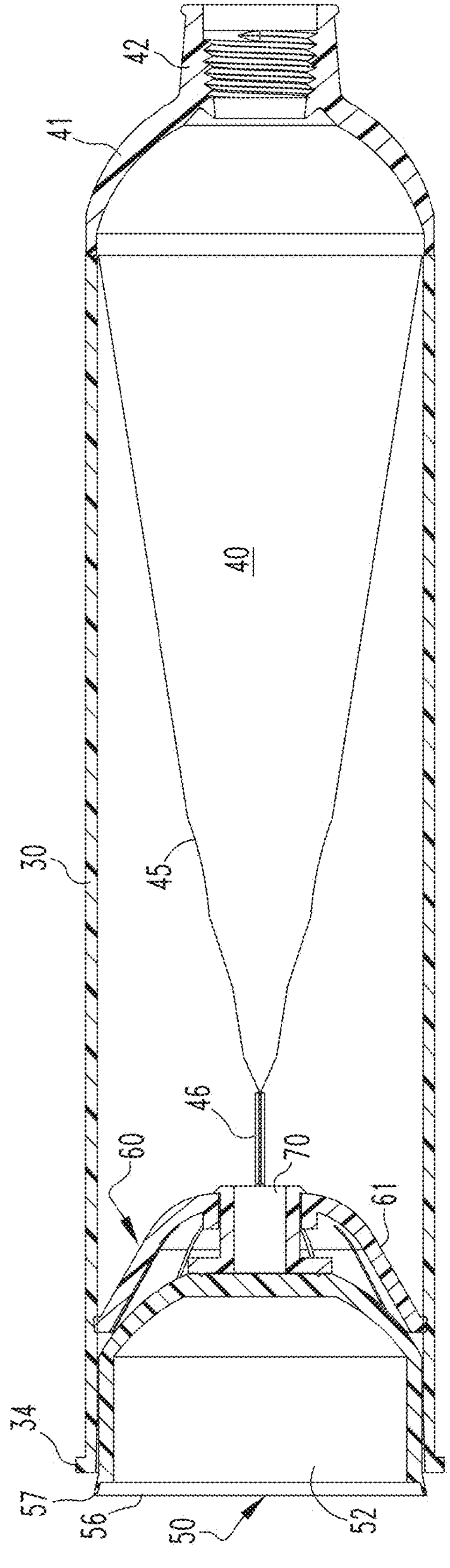
FIG. 3 is a sectional view taken through line 3-3 of FIG. 2.
Figure 4:
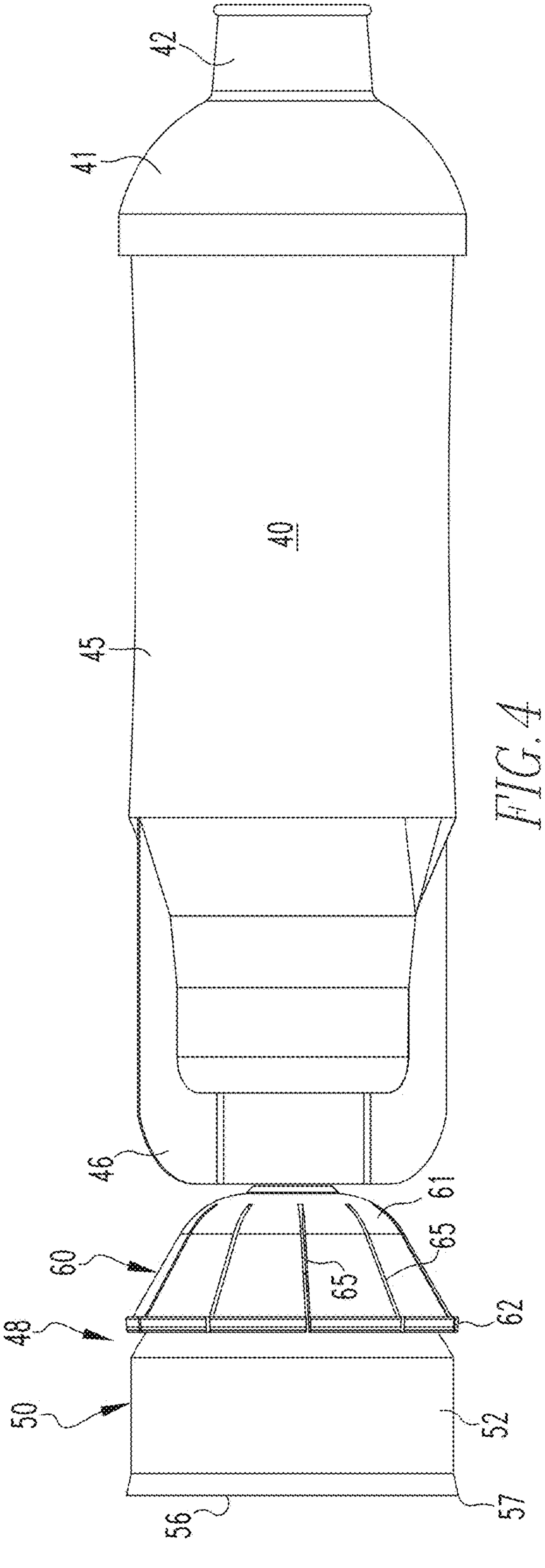
FIG. 4 is a side view of a collapsible sealant package and plunger with an anti-bypass retainer that may be contained within the sleeve of FIG. 2.
Figure 5:
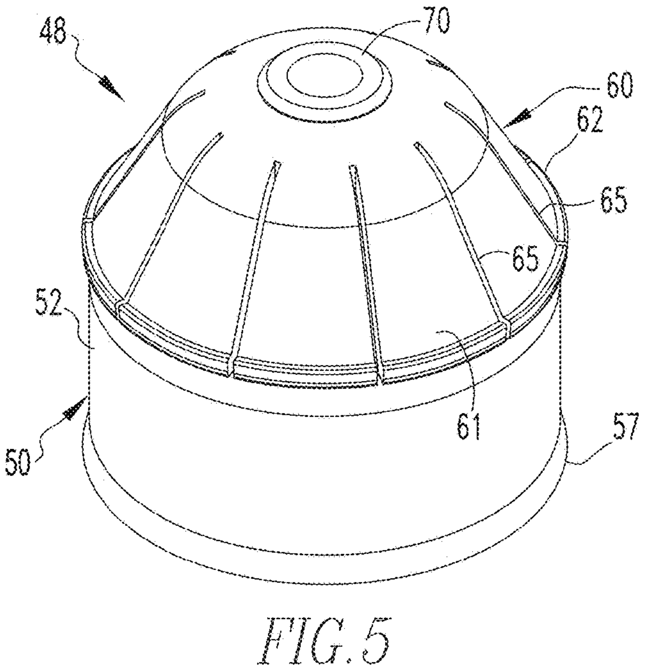
FIG. 5 is an isometric view and FIG. 6 is a side view of a plunger with an anti-bypass retainer of the present invention.
Figure 6:
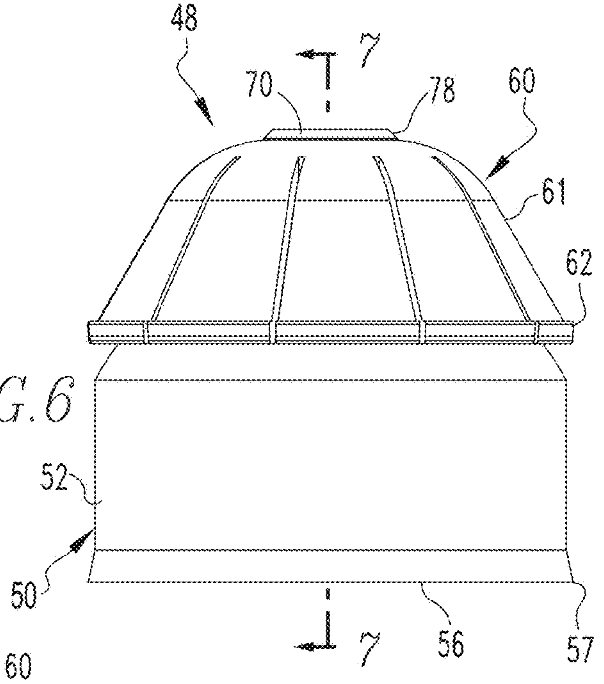

FIGS. 2-4 illustrate features of the inner sleeve 30, collapsible sealant packaging plunger 50 and anti-bypass retainer 60 of FIG. 1. As shown most clearly in FIG. 3, the plunger 50 has a cylindrical body 52, front end 53, domed transition 54 between the body 52 and front end 53, and rear end 56. A pneumatic seal ring 57 is provided at the rear end 56.

The anti-bypass retainer 60 includes a front dome 61 with divided side sections and anti-bypass retainer rim 62 that may be biased radially outward, as more fully described below. The retainer 60 includes a central axial hole 64 and slots 65 through the sidewall of the front dome 61 and a rim 62. The shape of the front dome 61 may be selected to substantially conform with the hemispherical dome 27 of the front cap assembly 20.

Figure 10:
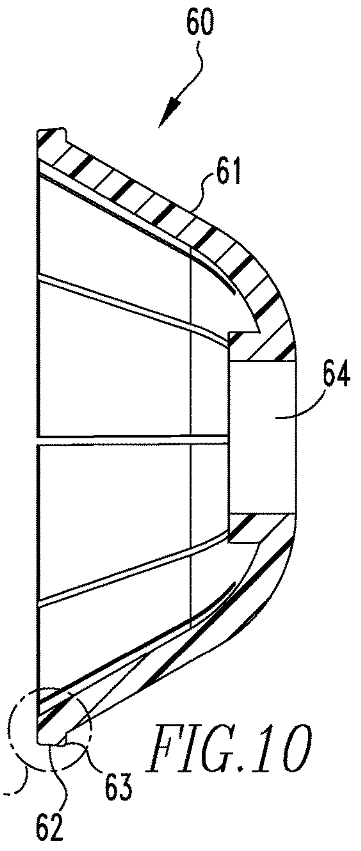
FIG. 10 is a sectional view taken through line 10-10 of FIG. 9.
Figure 11:
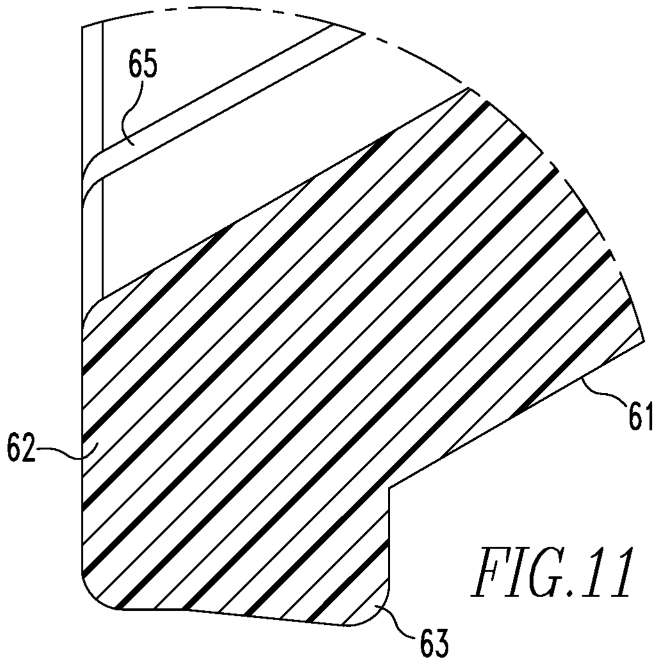
FIG. 11 is an enlarged view of a portion of FIG. 10.
Figure 12:
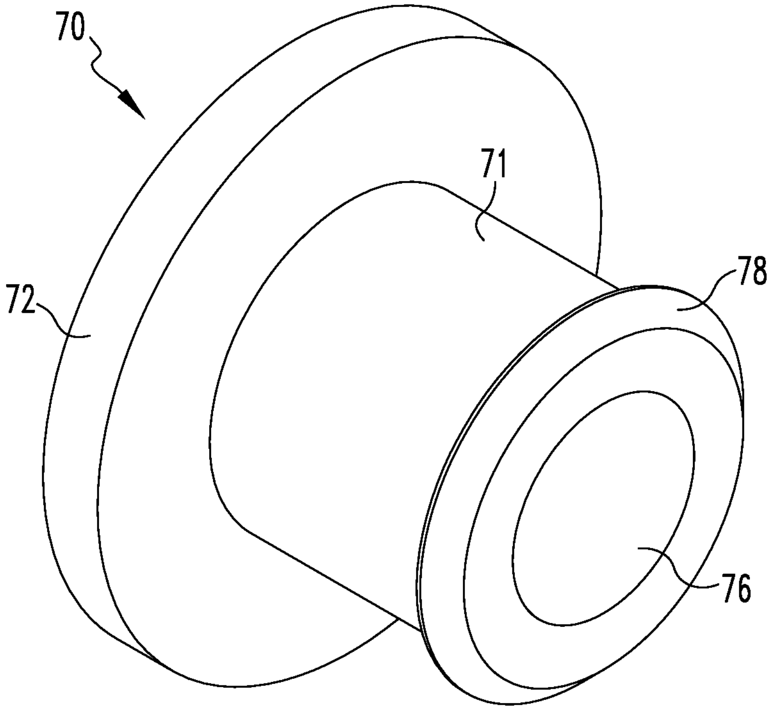
FIG. 12 is an isometric view and FIG. 13 is a side view of a retainer mounting post of the present invention.
Figure 13:
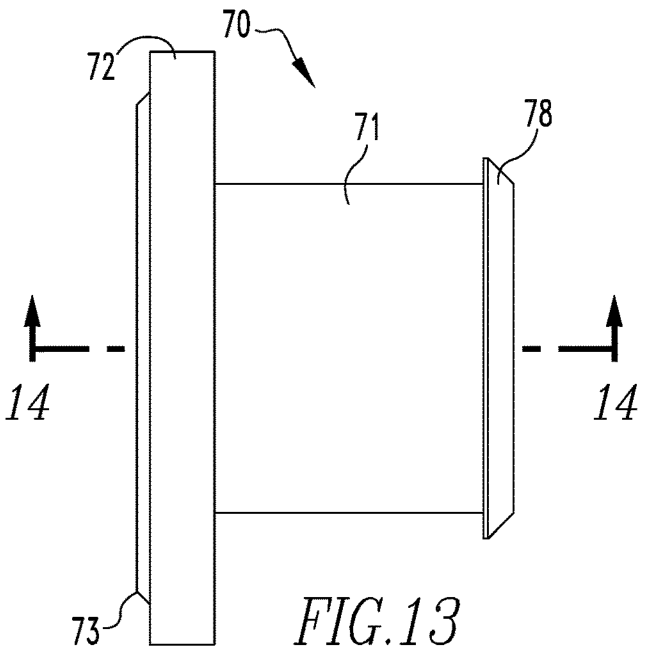
Figure 14:
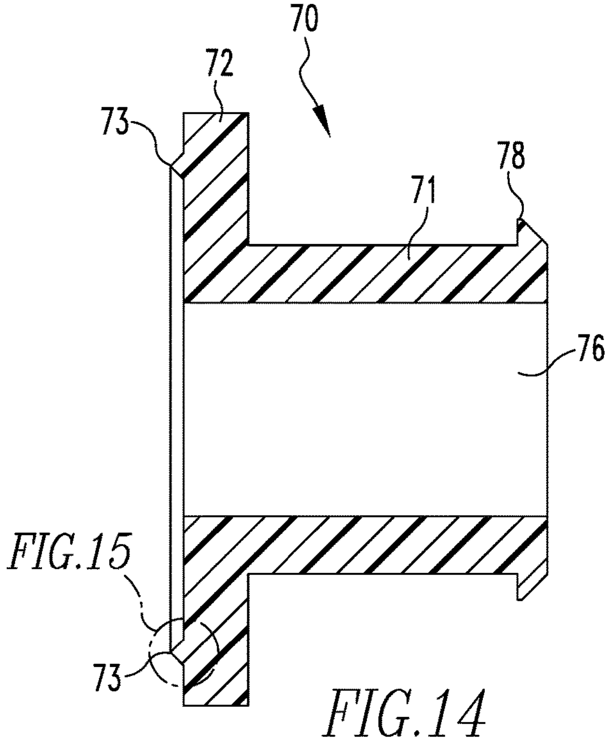
FIG. 14 is a sectional view taken through line 14-14 of FIG. 13.
Figure 15:
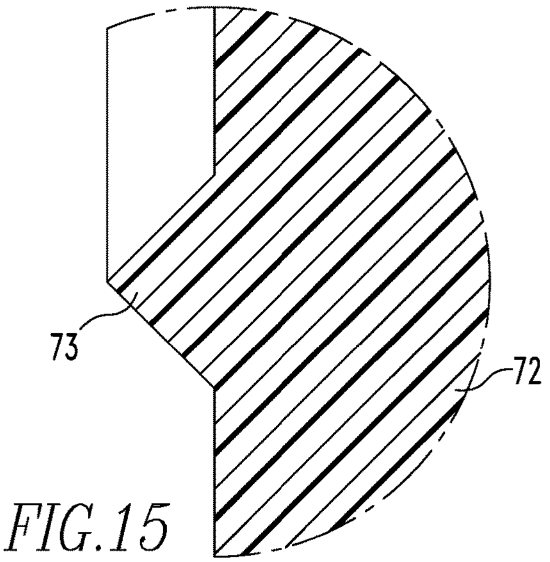
FIG. 15 is an enlarged view of the portion of FIG. 14.

Further details of the plunger 50 and anti-bypass retainer 60 of the plunger assembly 48 are shown in FIGS. 5-11. The plunger 50 includes a front end 53 that partially extends into an interior volume of the retainer 60. As shown in FIGS. 10 and 11, the retainer rim 62 includes an angled anti-bypass lip 63 that extends radially outward from the rim 62. The shape and dimensions of the anti-bypass lip 63 are selected in order to allow the flexible sidewall 45 of the collapsible packaging 40 to be gathered in a relatively organized manner such as folding or layering as the package collapses during dispensing. The retainer rim 62 and lip 63 thus contact the collapsible packaging and help prevent it from by sliding around anti-bypass retainer 60.

As shown in FIGS. 5-7 and 12-15, the anti-bypass retainer 60 includes a retainer attachment post 70 comprising a cylindrical body 71 and flange 72. An attachment ring 73 that may be provided for purposes of ultrasonic welding is provided on the rear face of the flange 72. A central axial hole 76 extends through the attachment post 70, and a retention lip 78 is provided on the front end of the cylindrical body 71.

During a sealant dispensing operation, the plunger 50 and retainer 60 are forced axially forward in the inner sleeve, typically by means of pneumatic pressure. Forward movement of the plunger 50 and retainer 60 forces the retainer 60 to press against the flexible sidewall 45 of the collapsible sealant packaging 40. The collapsible sealant packaging 40 and uncured sealant contained therein provide a reactive force against the retainer 60, which may cause the front dome 61 and retainer rim 62 to flex radially outward, and may cause the front portion of the front dome 61 to slide axially rearward on the cylindrical body 71 of the retainer attachment post 70. Prior to the anti-bypass retainer 60 coming into contact with the flexible sidewall 45 of the collapsible packaging 40, the outside diameter of the retainer rim 62 may be equal to or less than the outside diameter of the plunger 50. This allows for free movement up or down through the inner sleeve 30 for ease of initially loading the plunger 50 and retainer 60, and for reloading of a new collapsible package. For reloading of a new collapsible package, there is relative little resistance provided by the plunger 50 and retainer 60 as to require less force from the operator to slide the new collapsible package inside the inner sleeve 30. Pressure from the collapsible packaging 40 pushes down the anti-bypass retainer 60 near its front opening 64, thereby forcing the retainer rim 62 and lip 63 radially outward. The dome shaped geometry of the plunger 50 also provides support and guidance for the retainer 60 to move radially outwardly to the inner sleeve 30.

Upon deformation of the anti-bypass retainer 60, the lip 63 and rim 62 may press against the inner diameter of the inner sleeve 30 with force that is about 10 percent, or 20 percent, or 30 percent in comparison with a level of pneumatic pressure applied against the rear face of the plunger 50.

Figure 7:
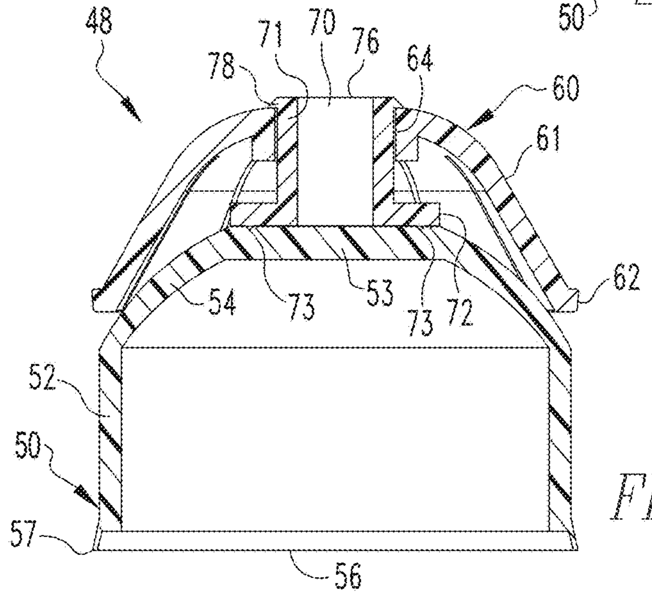
FIG. 7 is a sectional view of the plunger taken through line 7-7 of FIG. 6.
Figure 8:
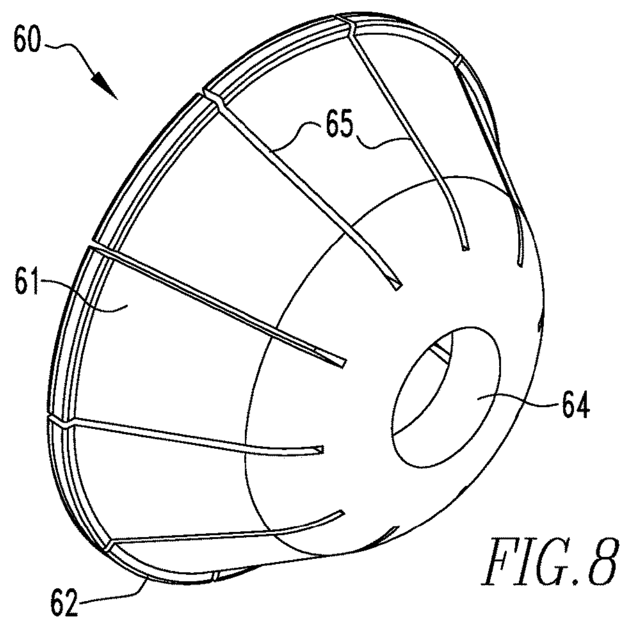
FIG. 8 is an isometric view and FIG. 9 is a front end view of an anti-bypass retainer member of the present invention.
Figure 9:
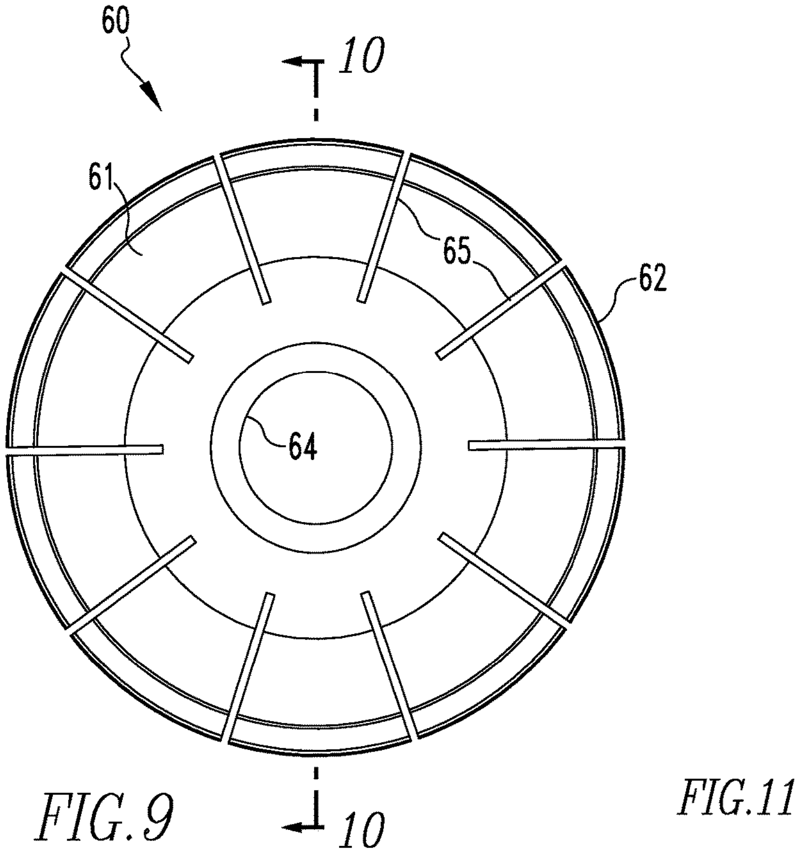
Figure 16:
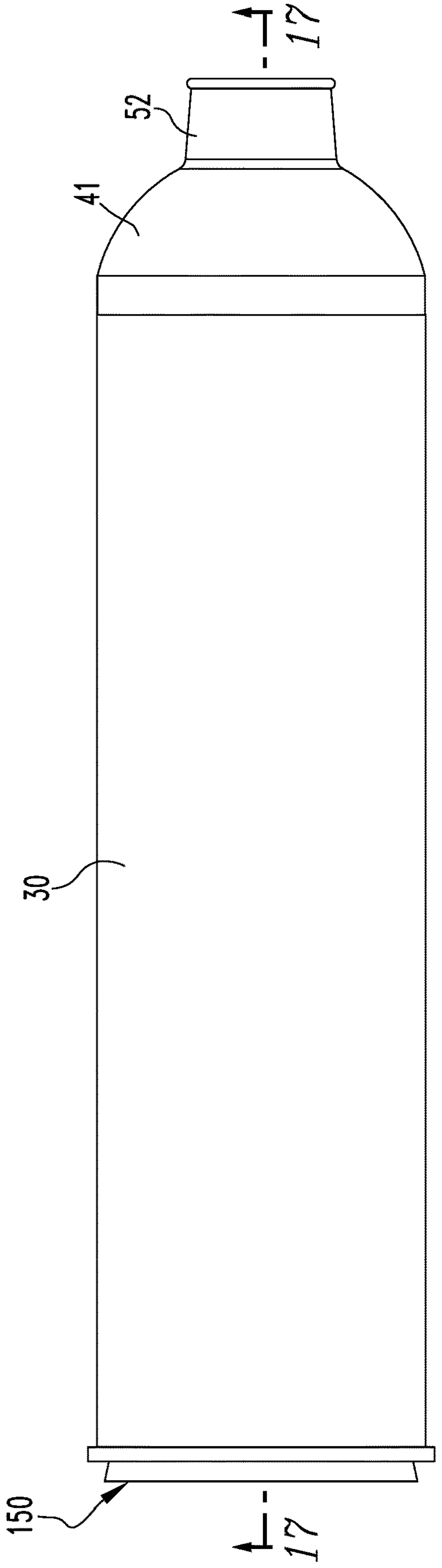
FIG. 16 is a side view of a sealant dispensing sleeve and front cap assembly including a plunger with an anti-bypass retainer of the present invention.
Figure 17:
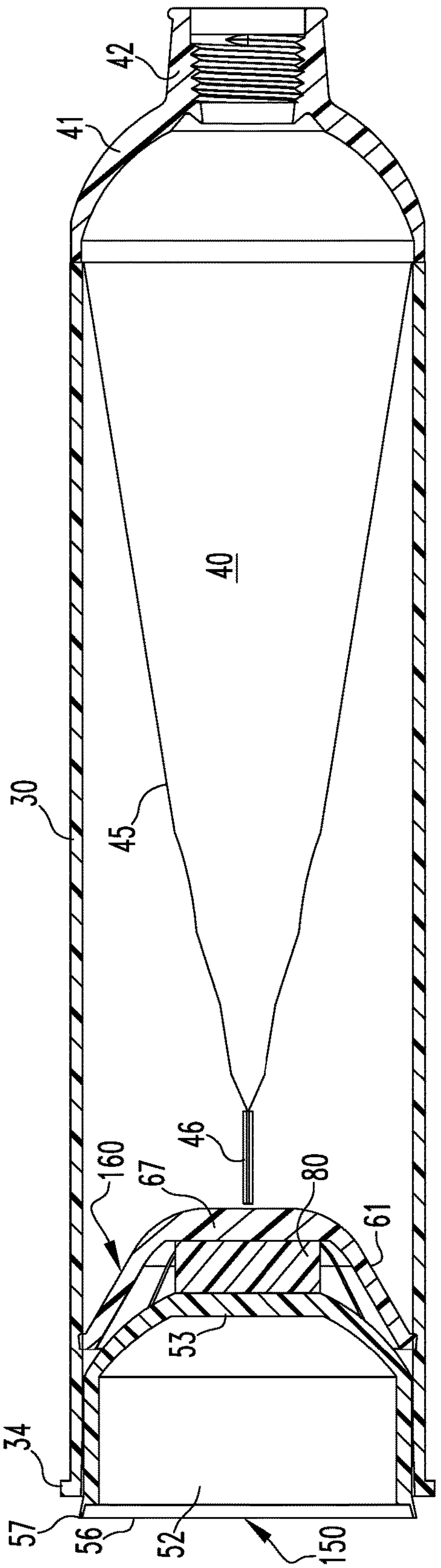
FIG. 17 is a sectional view taken through line 17-17 of FIG. 16.
Figure 18:
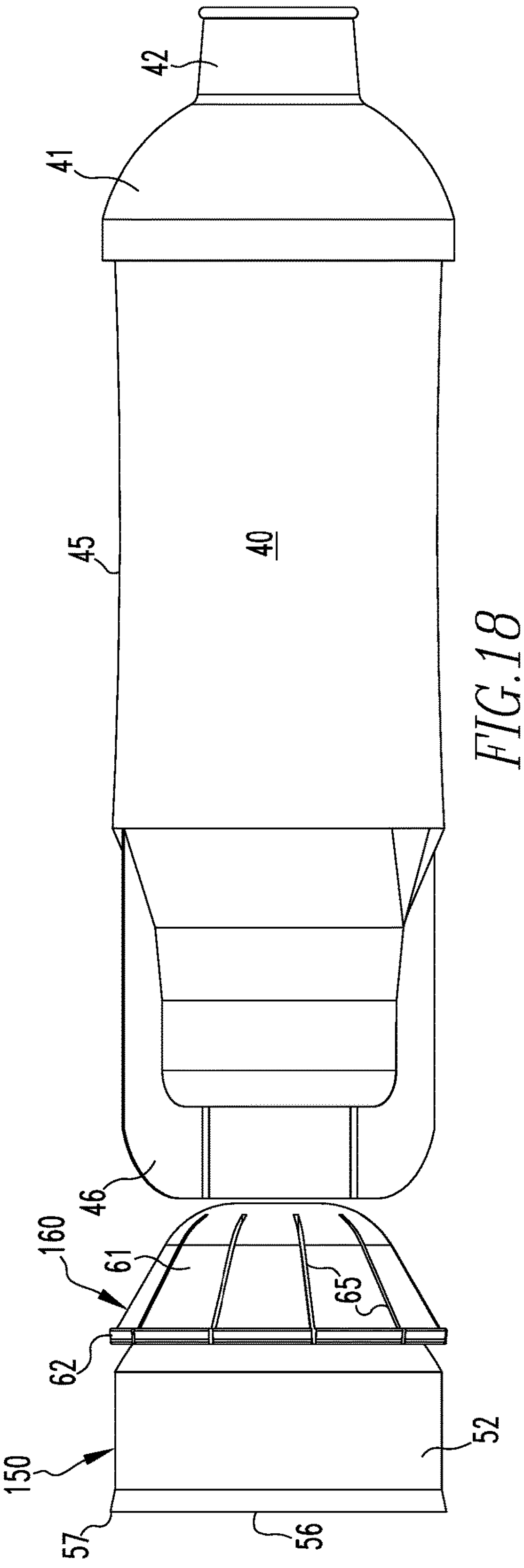
FIG. 18 is a side view of a collapsible sealant package and a plunger with an anti-bypass retainer that may be contained within a dispensing sleeve as shown in FIG. 16.

FIGS. 16-18 illustrate another plunger 150 and anti-bypass retainer 160 of the present invention. As shown most clearly in FIG. 17, many of the features shown in FIG. 7 are the same, with the exception of a closed retainer front wall 67 provided in the front dome 61 of the anti-bypass retainer 160. A retainer attachment disk 80 is secured between the front end 53 of the plunger 50 and the front wall 67 of the retainer 160. The retainer attachment disk 80 may be secured by any suitable means such as adhesives, ultrasonic welding, mechanical fasteners and the like. The retainer attachment disk 80 may be generally cylindrical and may be made of elastomeric or flexible material such as polyurethane, polyethylene, silicone foam or the like. When the retainer attachment disk 80 is made of an elastomeric material, the front dome 61 may flex in a similar manner as the front dome 61 shown in FIG. 7. The force applied by the rim 62 and lip 63 shown in FIG. 17 may be similar to that of FIG. 7.

Figure 19:
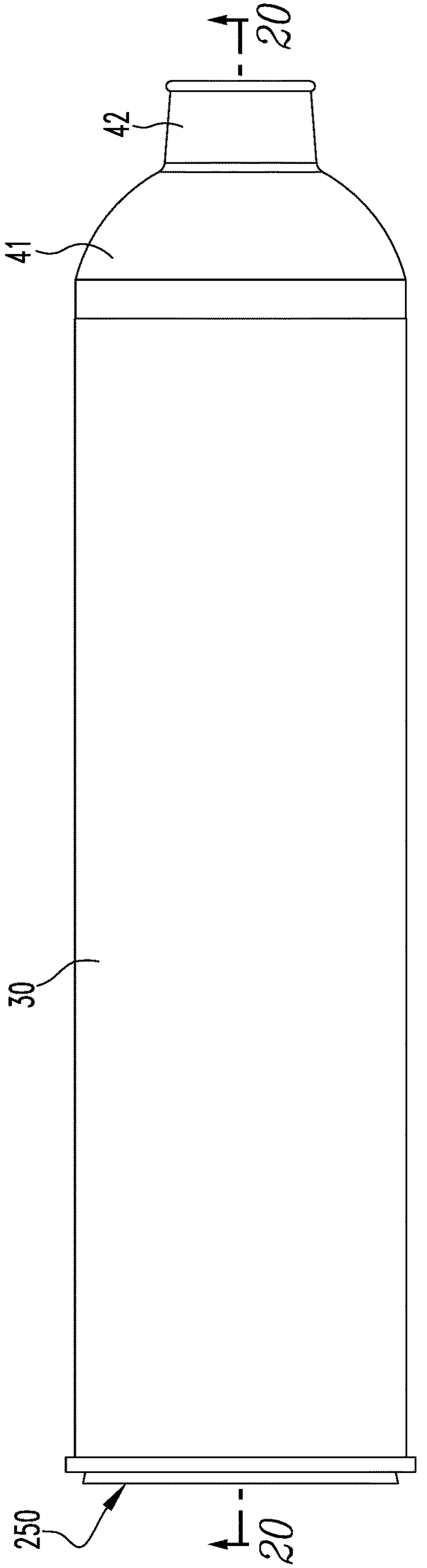
FIG. 19 is a side view of a sealant dispensing sleeve and front cap assembly including a plunger with an anti-bypass retainer of the present invention.
Figure 20:
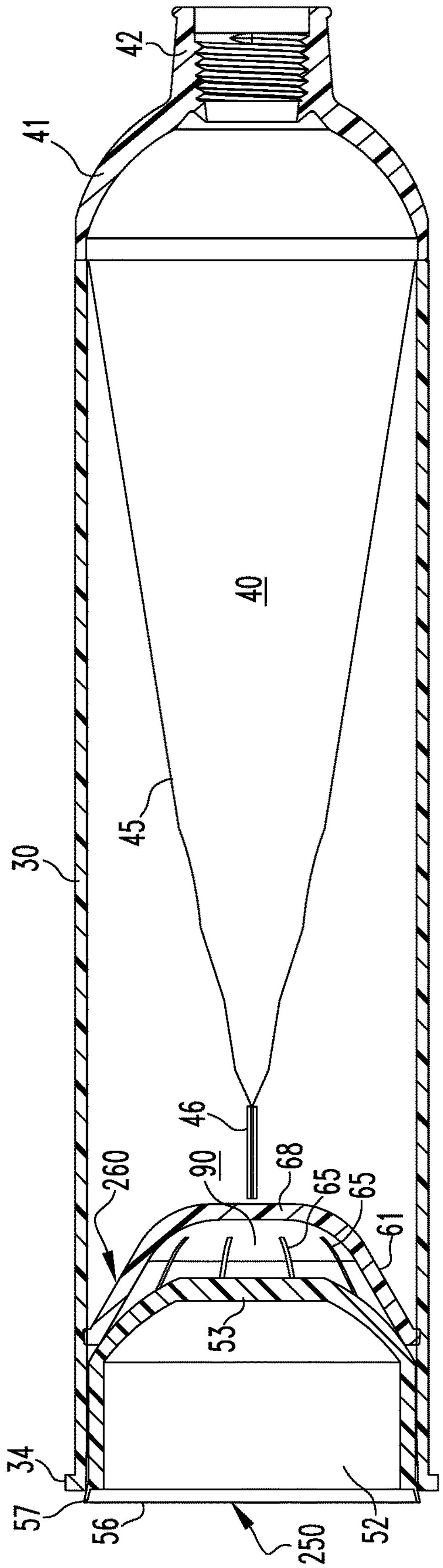
FIG. 20 is a sectional view taken through line 20-20 of FIG. 19.
Figure 21:
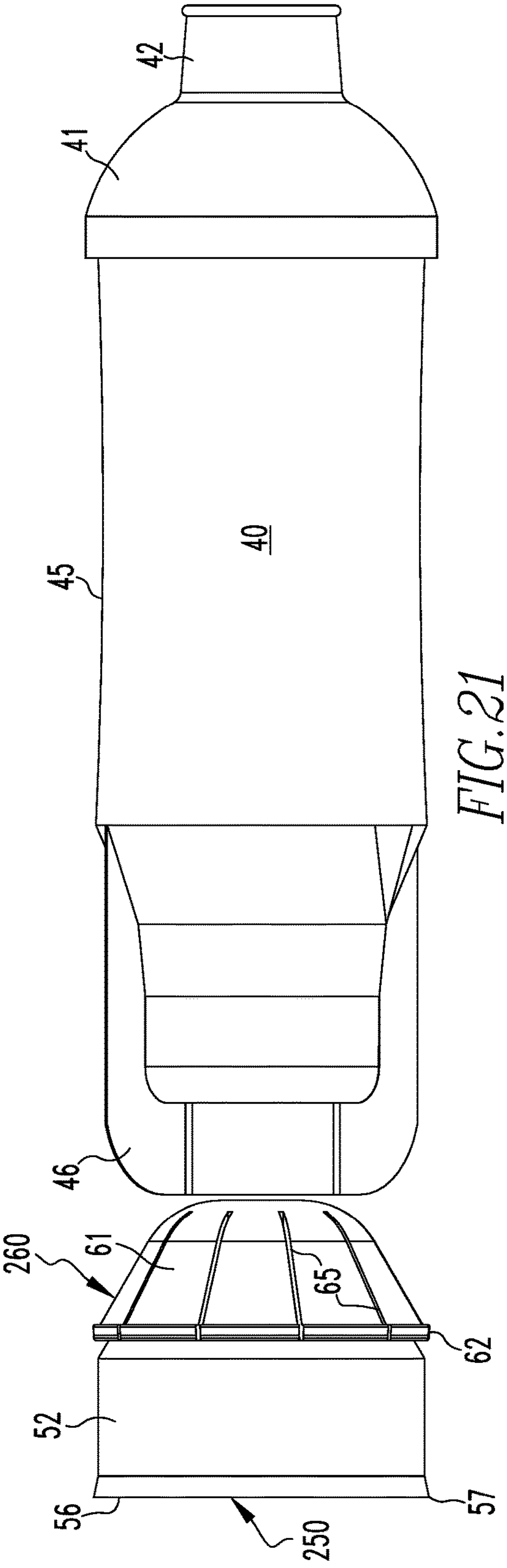
FIG. 21 is a side view of a collapsible sealant package and anti-bypass plunger that may be contained within a dispensing sleeve as shown in FIG. 19.

FIGS. 19-21 illustrate another plunger 250 and anti-bypass retainer 260 of the present invention. Many of the components are the same as shown in FIGS. 7 and 17. As shown in FIG. 20, a solid retainer front wall 68 is provided at the front of the dome 61, and an open space 90 is provided between the front of the plunger 53 and the retainer front wall 68. The anti-bypass retainer 260 may be in contact with, but otherwise unsecured to, the plunger 250. During operation, the anti-bypass retainer 260 and plunger 250 function in a similar manner as those of FIGS. 7 and 17, but with the retainer being free-floating against the plunger 250 instead of being mechanically secured thereto.

Figure 22:
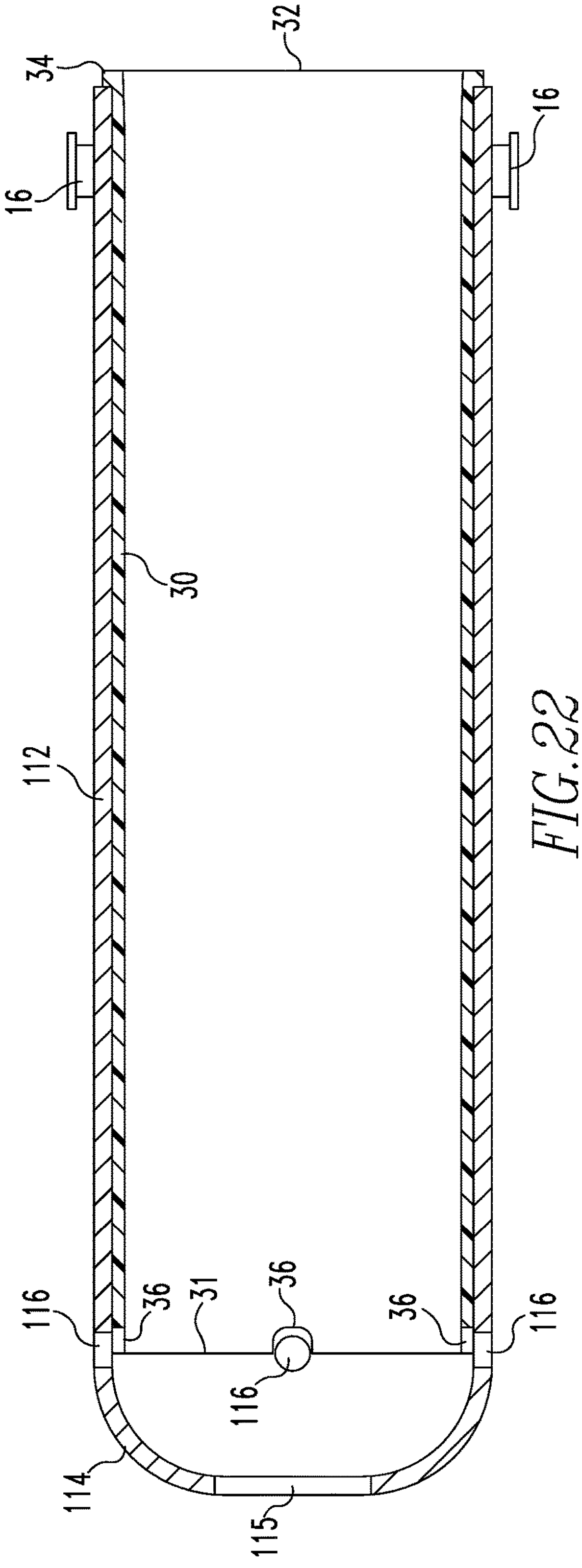
FIG. 22 is a side sectional view of a rear-loading sealant dispensing retaining sleeve with front vent holes and an inner sleeve inserted in the retaining sleeve with front vent notches of the present invention.

FIG. 22 illustrates a rear-loading outer retaining sleeve 112 that may be used with conventional rear-loading sealant dispensing systems known those skilled in the art. The rear-loading outer retaining sleeve 112 includes rear retaining pins 16 and a generally dome-shaped front end 114 with a central front opening 115 through which the front tip 42 of the collapsible sealant packaging 40 may extend. Multiple front vent holes 116 are provided adjacent the front end 114 of the outer retaining sleeve 112. Although four vent holes 116 spaced equally at 90° intervals around the circumference of the outer retaining sleeve 112 are shown in FIG. 22, it is understood that any other suitable number, arrangement, spacing, shape and size of vent holes may be used, for example, from 1 to 10 or more vent holes.

As further shown in FIG. 22, an inner sleeve 30 is inserted in the retaining sleeve 112. The inner sleeve 30 includes a front end 31, back end 32 and retaining flange 34. Multiple front vent notches 36 are provided in the front end 31 of the inner sleeve 30. Although four vent notches 36 spaced equally at 90° intervals around the circumference of the inner sleeve 30 are shown in FIG. 22, it is understood that any other suitable number, arrangement, spacing, shape and size of vent notches may be used, for example, from 1 to 10 or more vent notches. The vent notches 36 may be open as shown in FIG. 22 or may be closed, e.g., may be in the form of through-holes extending through the sidewall of the inner sleeve near the front end 31.

The vent notches 36 provide air flow paths from the interior of the inner sleeve 30 that contains the collapsible sidewall 45 of the sealant packaging 40 to thereby vent pressurized air that could otherwise remain trapped inside the inner sleeve 30. The vent holes 116 of the outer retaining sleeve 112 are in air flow communication with the vent notches 36 of the inner sleeve 30 to thereby facilitate the escape of pressurized air from the inner sleeve 30 to atmosphere. The vent notches 36 and vent holes 116 may be aligned with each other, for example, by providing features on the inner sleeve 30 and/or the outer retaining sleeve 112 that provide such alignment. Alternatively, the vent notches 36 and vent holes 116 may not necessarily be aligned with each other, in which case air can pass through the space between the outer surface of the inner sleeve 30 and the inner surface of the outer retaining sleeve 112 before being exhausted through the vent holes 116. Although vent notches 36 are shown in the inner sleeve in FIG. 22, similar vent notches 36 may be provided in the inner sleeve of front-loading sealant dispensing systems, such as the inner sleeve 30 of the system 10 shown in FIG. 1. Unwanted build up of air pressure inside the inner sleeve 30 of such front-loading systems may pass through the vent notches 36 and escape to atmosphere through the open spaces of the removable front cap 24.

Air venting from the interior volume of the inner sleeve 30 may provide for controlled collapse of the flexible sidewall 45 of the collapsible packaging 40 during sealant dispensing operations, for example, by ensuring that the rear end 46 of the collapsible sidewall is pushed forward by the plunger 50 and anti-bypass retainer 60 to dispense the sealant through the front opening 43 rather than allowing pressurized air to press directly against the sidewall 45. Such unwanted air pressure against the sidewall 45 can cause the sidewall 45 to constrict in the middle, thereby trapping a portion of the sealant and preventing its flow through the front opening 43. The air venting provided by the vent notches 46 may also reduce or prevent unwanted sealant discharge or drool that may otherwise occur after air pressure against the back side of the plunger 50 is removed at the end of a dispensing operation.

The retainers 12 and 112 may be made of any suitable rigid material such as metal, plastic and the like. For example, the retainers 12 and 112 may be made of steel or aluminum. A viewing slot (not shown) may optionally be provided through the retainer 12, 112, e.g., running parallel with the longitudinal axis of the retainer 12, 112. The front cap assembly may be made of any suitable material such as plastic or metal. For example, the front cap assembly may be made of a polymer such as nylon. The sleeve 30 and plunger 50 may be made of any suitable materials such as plastic, e.g., polyethylene, polyurethane, polypropylene or the like. The plastic sleeve 30 may be slightly resilient or flexible and may have lower thermal conductivity than the retainer 12, 112, i.e., to provide thermal insulation.

The flexible sidewall 45 of the cartridge 40 may be made of relatively thin sheets of laminated foil or any other suitable type of collapsible material. The domed rigid front end 41 may be made of relatively rigid materials such as plastic and the like. For example, the rigid front end 41 and front tip 42 may be made of a polymer such as polyethylene. The sealant contained in the cartridge 40 may be any suitable sealant or adhesive formulation known to those skilled in the art such as those used in the aerospace industry.

The retainer systems of the present invention may be used with standard adhesive and sealant guns known to those skilled in the art including, but not limited to, pneumatically driven guns sold under the designations Semco Model 250-A, Model 250-B and Model 350.

The front-loading sealant dispensing system 10 as shown in FIG. 1 may be loaded by the following steps: remove the front cap 24 from the retainer 12 by turning the cap counterclockwise; remove the used flexible cartridge 40 and discard appropriately; load the new flexible cartridge 40 through the front of the retainer 12 and sleeve 30, pushing back the plunger 50 and retainer 60 inside the sleeve 30; place the front cap 24 back on the retainer 12 and secure, e.g., by threading clockwise on until tight; ready to dispense. The rear-loading sealant dispensing retaining sleeve 112 and inner sleeve 30 with front vent notches 36 as shown in FIG. 22 may be loaded in a conventional manner known to those skilled in the art.

It is to be understood that the invention may assume various alternative variations and step sequences, except where expressly specified to the contrary. Moreover, other than in any operating examples, or where otherwise indicated, all numbers such as those expressing values, amounts, percentages, ranges, sub-ranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed- or open-ended numerical range is described herein, all numbers, values, amounts, percentages, sub-ranges and fractions within or encompassed by the numerical range are to be considered as being specifically included in and belonging to the original disclosure of this application as if these numbers, values, amounts, percentages, sub-ranges and fractions had been explicitly written out in their entirety.

Notwithstanding that the numerical ranges and parameters setting forth the broad scope of the invention are approximations, the numerical values set forth in any of the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. In addition, in this application, the use of "or" means "and/or" unless specifically stated otherwise, even though "and/or" may be explicitly used in certain instances.

As used herein, "including", "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention.

What is claimed is:

1. A plunger assembly for use in a sealant dispensing cartridge comprising:

a plunger comprising a cylindrical body and front end; and an anti-bypass retainer contacting the plunger comprising a front portion and an anti-bypass rim structured and arranged to expand radially outward when force is applied to the front portion, wherein the anti-bypass rim has an outer diameter less than or equal to an outer diameter of the plunger prior to the application of the force to the front portion, and has another outer diameter equal to or greater than the outer diameter of the plunger after the application of the force to the front portion.

2. The plunger assembly of claim 1, wherein the front portion of the plunger is dome shaped.

3. The plunger assembly of claim 1, wherein at least a portion of the plunger comprises slots extending therethrough forming separated segments around a circumference of the plunger.

4. The plunger assembly of claim 3, wherein the slots extend through a sidewall of the front portion of the plunger and through the anti-bypass rim.

5. The plunger assembly of claim 1, wherein the anti-bypass rim of the retainer comprises an angled annular anti-bypass lip extending radially outward.

6. The plunger assembly of claim 1, wherein the anti-bypass retainer is structured and arranged to allow airflow between a front surface of the anti-bypass retainer and a rear surface of the anti-bypass retainer.

7. The plunger assembly of claim 6, wherein openings are provided in the front portion or the anti-bypass rim of the anti-bypass retainer to allow the airflow.

8. The plunger assembly of claim 1, wherein the anti-bypass retainer is secured to the plunger.

9. The plunger assembly of claim 8, wherein the anti-bypass retainer is secured to the plunger by a retainer attachment post comprising a rear flange attached to a front end of the plunger and a cylindrical body extending axially forward from the flange in contact with the anti-bypass retainer.

10. The plunger assembly of claim 9, wherein the anti-bypass retainer comprises a central axial hole slidingly receiving a portion of the cylindrical body of the retainer attachment post.

11. The plunger assembly of claim 10, wherein the retainer attachment post comprises a retention lip at a front end thereof structured and arranged to retain the anti-bypass retainer on the cylindrical body of the retainer attachment post.

12. An assembly for use in the sealant dispensing cartridge of claim 1 comprising:

a sleeve; and the plunger assembly of disposed in the sleeve.

13. A sealant dispensing system comprising:

collapsible sealant packaging comprising a rigid front end including a front opening and a flexible sidewall extending rearwardly from the rigid front end;

an inner sleeve structured and arranged to receive the flexible sidewall; and a plunger with an anti-bypass retainer inserted in the inner sleeve structured and arranged to slide forwardly along a longitudinal axis of the inner sleeve and press against a rear end of the flexible sidewall when air pressure is applied against a rear surface of the plunger, wherein the anti-bypass rim has an outer diameter less than or equal to an outer diameter of the plunger prior to the application of the force to the front portion, and has another outer diameter equal to or greater than the outer diameter of the plunger after the application of the force to the front portion.

14. The sealant dispensing system of claim 13, further comprising a front-loading outer retaining sleeve containing the inner sleeve.

15. The sealant dispensing system of claim 14, wherein the inner sleeve comprises at least one front vent notch in a front end of the inner sleeve.

16. The sealant dispensing system of claim 13, further comprising a rear-loading outer retaining sleeve containing the inner sleeve.

17. The sealant dispensing system of claim 16, wherein the inner sleeve comprises at least one front vent notch in a front end of the inner sleeve.

18. The sealant dispensing system of claim 17, wherein the rear-loading outer retaining sleeve comprises at least one front vent hole adjacent a front end of the outer retaining sleeve in air flow communication with the at least one vent notch of the inner sleeve to allow trapped air in the inner sleeve to escape through the at least one front vent notch and through the at least one front vent hole.

19. A plunger assembly for use in a sealant dispensing cartridge comprising:

a plunger comprising a cylindrical body and front end; and an anti-bypass retainer contacting the plunger comprising a front portion and an anti-bypass rim structured and arranged to expand radially outward when force is applied to the front portion, wherein the anti-bypass retainer is secured to the plunger by a retainer attachment post comprising a rear flange attached to a front end of the plunger and a cylindrical body extending axially forward from the flange in contact with the anti-bypass retainer.

20. A sealant dispensing system comprising:

collapsible sealant packaging comprising a rigid front end including a front opening and a flexible sidewall extending rearwardly from the rigid front end;

an inner sleeve structured and arranged to receive the flexible sidewall comprising at least one front vent notch in a front end of the inner sleeve;

a plunger with an anti-bypass retainer inserted in the inner sleeve structured and arranged to slide forwardly along a longitudinal axis of the inner sleeve and press against a rear end of the flexible sidewall when air pressure is applied against a rear surface of the plunger; and a front-loading outer retaining sleeve containing the inner sleeve.

21. A sealant dispensing system comprising:

collapsible sealant packaging comprising a rigid front end including a front opening and a flexible sidewall extending rearwardly from the rigid front end;

an inner sleeve structured and arranged to receive the flexible sidewall;

a plunger with an anti-bypass retainer inserted in the inner sleeve structured and arranged to slide forwardly along a longitudinal axis of the inner sleeve and press against a rear end of the flexible sidewall when air pressure is applied against a rear surface of the plunger; and a rear-loading outer retaining sleeve containing the inner sleeve.

22. The sealant dispensing system of claim 21, wherein the inner sleeve comprises at least one front vent notch in a front end of the inner sleeve.

* * * * *